United States Patent [19]

Daghe et al.

[11] 4,057,357
[45] Nov. 8, 1977

[54] CHIPLESS SHELL CUTTER FOR LARGE DIAMETER PLASTIC PIPE

[75] Inventors: Joseph L. Daghe, Decatur; Casimir B. Kuzmicki, Chicago, both of Ill.

[73] Assignee: Mueller Co., Decatur, Ill.

[21] Appl. No.: 634,753

[22] Filed: Nov. 24, 1975

[51] Int. Cl.$^2$ .................... B23B 41/08; B23B 51/04
[52] U.S. Cl. .................................. 408/67; 408/209; 408/703; 408/713
[58] Field of Search ............... 408/67, 111, 186, 204, 408/205, 206, 207, 208, 209, 703, 713

[56] References Cited

U.S. PATENT DOCUMENTS

| | | | |
|---|---|---|---|
| 2,027,139 | 1/1936 | Abramson et al. | 408/205 |
| 2,179,029 | 11/1939 | Barnes | 408/206 |
| 2,941,427 | 6/1960 | Ver Nooy | 408/67 X |
| 3,349,792 | 10/1967 | Larkin | 408/67 X |
| 3,564,946 | 2/1971 | Käser | 408/204 |

*Primary Examiner*—Othell M. Simpson
*Assistant Examiner*—Z. R. Bilinsky
*Attorney, Agent, or Firm*—Cushman, Darby & Cushman

[57] ABSTRACT

A rotatable shell cutter member for cutting a hole in large diameter and thick wall plastic pipe. The shell cutter member is rotated and advanced with a positive predetermined lead against the plastic pipe and it first forms a hole in the plastic pipe by cutting and retaining a coupon therefrom and it further progressively enlarges the hole to a diameter equal to or slightly greater than the overall outside diameter of the shell cutter member. The chips initially cut from the plastic pipe in cutting the coupon are discharged upwardly and inwardly of the shell cutter member above the coupon being cut and, when the shell cutter member with its cutting edge in constant cutting engagement with the pipe begins cutting a continuous chip cut, it is also discharged upwardly and inwardly of the shell cutter member. The cutter blade for cutting the plastic pipe is detachably secured to the body member of the shell cutter member so that it may be easily removed and replaced or resharpened and cleaned when the situation requires such action. A drilling machine powered by a compressed air motor, electric motor or gasoline powered engine may be used to rotate and advance the shell cutter member although hand operated drilling machines with positive feed advance may also be used.

23 Claims, 8 Drawing Figures

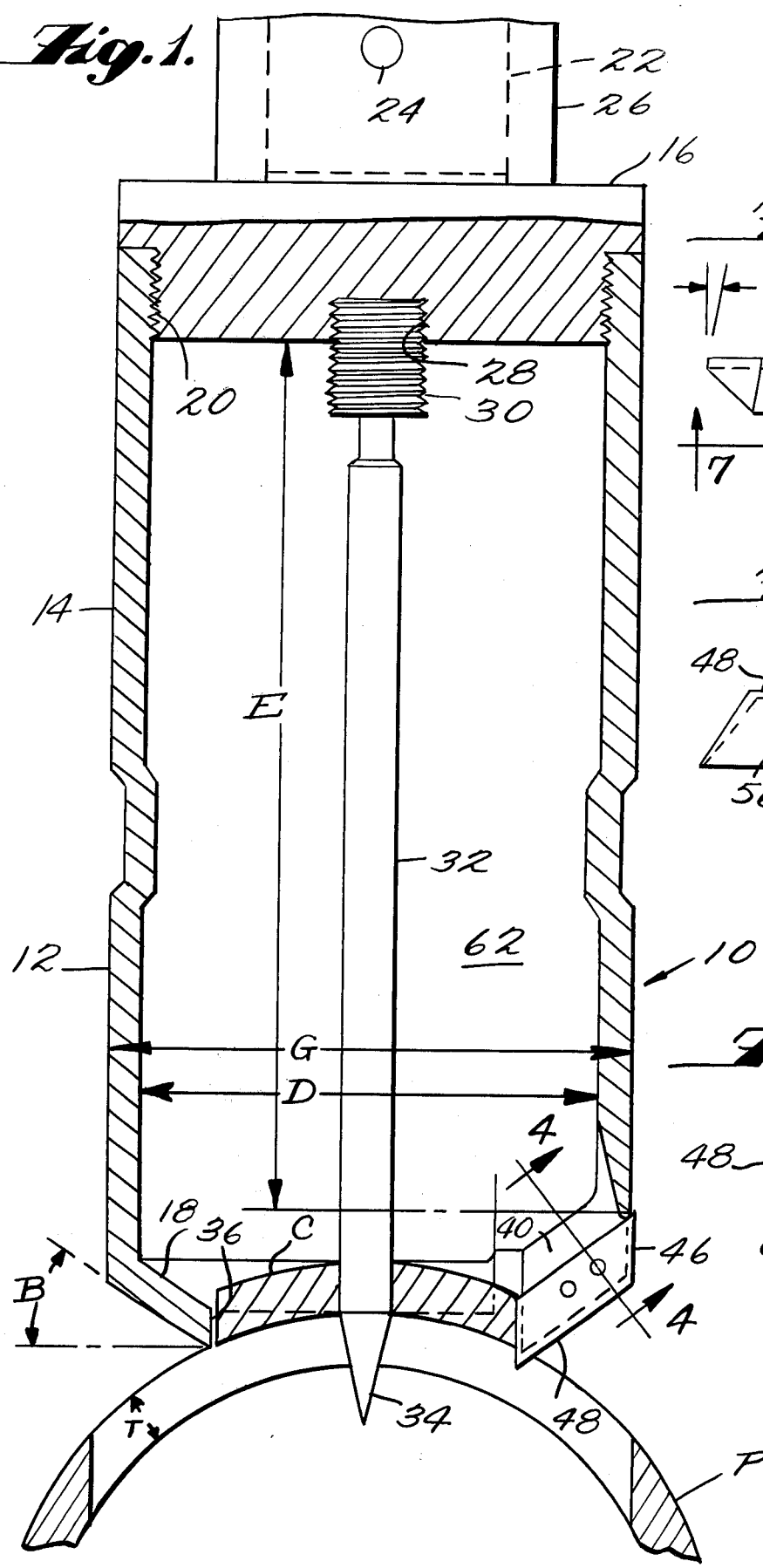
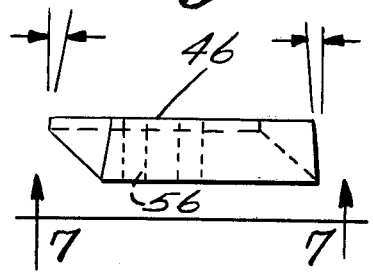
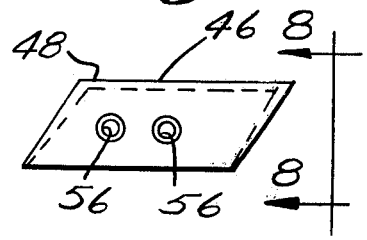
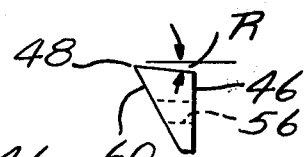

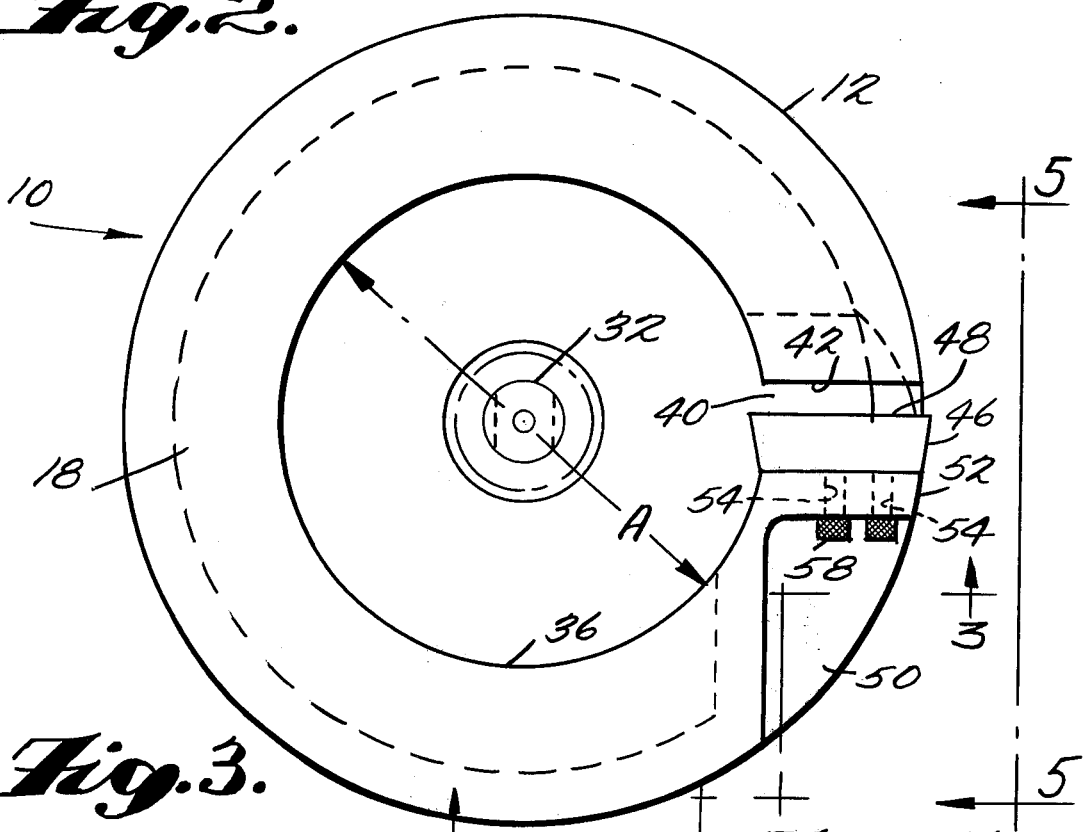
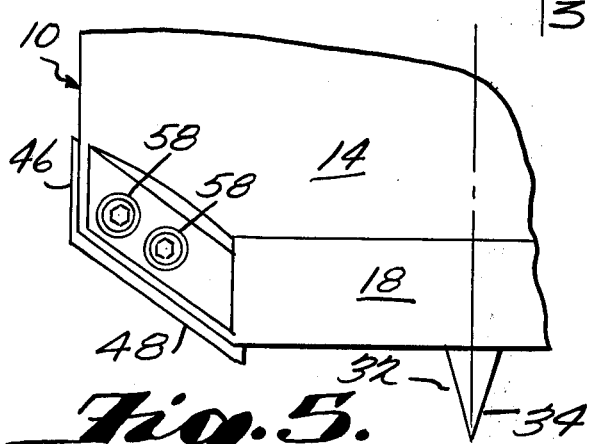
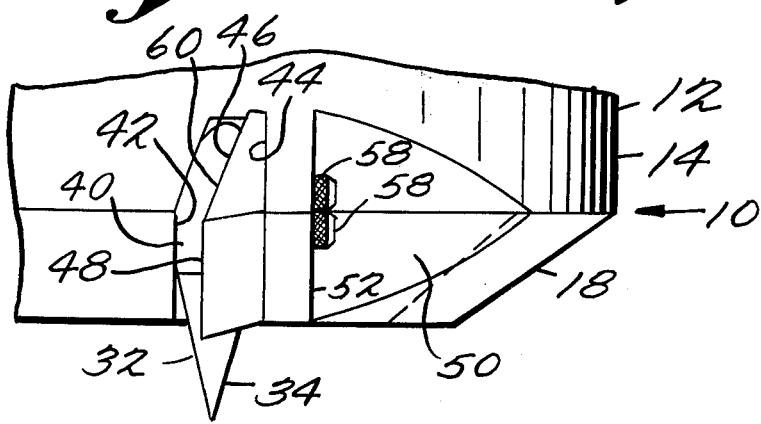
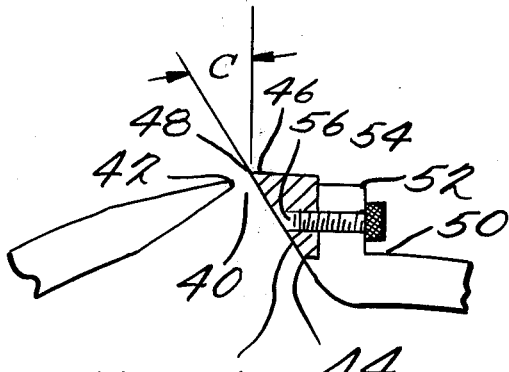

CHIPLESS SHELL CUTTER FOR LARGE DIAMETER PLASTIC PIPE

The present invention relates to an improvement in shell cutter members for cutting holes in large diameter and thick wall plastic pipe, the shell cutter member having a configuration which causes all material cut from the plastic pipe whether it be chips or continuous shavings to be received and retained in the shell cutter member in the cavity or chamber above the coupon cut. Intrinsic design criteria with respect to the dimensions and configuration of the shell cutter member are critical for making various size cutters for cutting holes in various large diameter and thick wall plastic pipe. While these design criteria are critical for shell cutter members used on large diameter thick wall pipe, the shell cutter member though so designed, may also be used satisfactorily on large diameter thin wall pipe.

BACKGROUND OF THE INVENTION

The present invention is an improvement over existing shell cutter members for cutting holes in large diameter pipe. Heretofore shell cutter members have been provided with a plurality of teeth silver-soldered to the lower end of the body member and separated by flutes extending upwardly on the body member. In these prior art shell cutter members, which were primarily used for cutting through metallic pipe or asbestos concrete pipe, the chips or shavings cut from the pipe were oftentimes dropped into the pipe. Attempts have been made to obtain "chipless" cutting, these attempts usually taking the route of providing sleeves on the outside of the cutters in a attempt to trap the chips or shavings. The prior attempts at providing "chipless" cutting have resulted in high torque for the operation and they were not effective to completely retain the chips. The flutes used between the teeth of these prior shell cutter members were oftentimes designed to try and direct the chips outwardly of the shell cutter member but even in this type of design, the chips would fall around the exterior of the pipe adjacent the hole and when the shell cutter was removed from the hole in the pipe the chips would fall backwards into the pipe.

In metal pipes where the metal was of a ferrous material or the like and chips did fall into the pipe, magnetic means could be used to clean out the inside of the pipe. This is not true in a situation where plastic pipe is used and thus if any chips did fall into the pipe, such chips could interfere with the operation of equipment downstream of where the hole was being cut, such as in valves or the like.

In U.S. Pat. No. 3,870,431 issued Mar. 11, 1975 to Lawrence F. Luckenbill and Daniel A. Ellis, and assigned to the same assignee as this application, namely, Mueller Co., Decatur, Illinois, there is disclosed a chipless cutter member for cutting holes in small diameter thick or thin wall pipe, the design of the cutter member being such that the chips are directed into the cavity or chamber of a cylindrically shaped metal body member. However, this cutter, while extremely effective when used on small diameter plastic pipe, is not particularly adaptable for large diameter pipes of, for example, 4 inch to 12 inch and greater diameters. In cutting large diameter plastic pipes and obtaining a large diameter hole in the pipe, a large amount of material must be removed from the pipe in addition to the coupon being cut and consequently the design criteria of this prior art cutter member is not adaptable to accommodate the situation with respect to large diameter pipes. Additionally, the torque for rotating and advancing such a cutter member would increase with the size of the hole being cut because the wall of the body member of the cutter member is in frictional contact with the wall of the hole being cut.

PRIOR ART

Prior art arrangements of shell cutter members having a plurality of teeth for cutting large diameter holes in large diameter pipe, as well as the drilling machines for rotating and advancing the shell cutter members with a positive predetermined lead are disclosed in the following patents:

| NUMBER | NAME | DATE |
|--------|------|------|
| 1,094,425 | CASH | April 28, 1914 |
| 1,898,935 | BRANDRIFF | Feb. 21, 1933 |
| 2,179,029 | BARNES | Nov. 7, 1939 |
| 2,800,812 | MUELLER ET AL. | July 30, 1957 |
| 3,609,056 | HOUGEN | Sept. 28, 1971 |

In the above-mentioned patents, it will be noted that the shell cutter members do not have provisions for positively retaining the chips or shavings within the cutter member although they do show cutting a coupon and retaining the same on a pilot drill concentrically arranged within the shell cutter member. The chips or shavings resulting from the cutting action of these shell cutter members usually fall on the outside of the cutter member about the hole being cut. In some instances the chips or shavings are positively moved to the outside of the shell cutter member by means of the flutes or slots provided on the body of the shell cutter member between the teeth.

Other prior art arrangements of core drills, reamers, or plug cutters may be found in the following patents:

| NUMBER | NAME | DATE |
|--------|------|------|
| 525,466 | MARSH ET AL. | Sept. 4, 1894 |
| 1,145,822 | WILDER | July 6, 1915 |
| 2,748,817 | STEARNS | June 5, 1956 |
| 2,978,002 | RANSOM | April 4, 1961 |

In the immediately above-listed patents the core drill and the plug cutters do not provide for accurate control of the disposition of the chips or shavings within the cutter members whereas the reamer disclosed in U.S. Pat. No. 525,466 does attempt to control the chips of wood by directing them to the interior of the hollow cutter head. However, the reamer is not utilized for cutting a hole but rather reaming a previously bored hole, and thus would not be adaptable to cutting a hole in a plastic pipe.

BRIEF SUMMARY OF THE INVENTION

The present invention provides an improved rotatable shell cutter member for cutting a hole in large diameter plastic pipe by cutting a coupon from the pipe to initially form the hole and then enlarging the formed hole as the shell cutter member is positively advanced against the pipe a predetermined distance or lead per rotation of the same. The chips or shavings removed from the plastic pipe are directed inwardly and upwardly into the chamber or cavity of the shell cutter member and are prevented from falling from the shell cutter member by the coupon cut since the coupon is retained in the shell cutter member by a concentrically positioned pilot drill. In more detail, the rotatable shell cutter member includes a metal hollow body member closed at one end and open at its other end to define a chamber for chips and/or shavings cut from the pipe, the body member having a cylindrical portion closed at one end and terminating at the other end in a frusto-conical end portion. The frusto-conical end portion has a generally lengthwise-extending slot with a leading face and a trailing face as defined by the direction of rotation of the shell cutter member. A blade member is provided on the trailing face of the slot and is spaced from the leading face, the blade member having a cutting edge positioned beyond the frusto-conical end portion of the body member and being generally parallel to the frusto-conical end portion of the body member.

Another aspect of the present invention is providing a blade member having a cutting edge with an extent slightly greater than the extent of the frusto-conical end portion in a transverse plane of the body member so that there is blade overlap at least outwardly of the cylindrical portion of the body member of the shell cutter member whereby the maximum diameter of the hole being cut is slightly greater than the maximum outside diameter of the body member thereby reducing the torque necessary to rotate the shell cutter member. Also, there may be blade overlap inwardly of the frusto-conical end portion to provide relief between the coupon cut and the inner wall of the opening of the frusto-conical end portion.

Still another aspect of the present invention is providing means to detachably secure the blade member to the frusto-conical end portion of the body member whereby the blade member may be removed for sharpening and/or cleaning or replacing.

The rotatable shell cutter member of the present invention has critical design criteria with respect to the effective length of the chamber or cavity in the body member from the upper end of the frusto-conical end portion to the closed end of the body member which is dependent on the inside area of the body member and on a projected frontal area to be cut of the plastic pipe coupled with the wall thickness of the plastic pipe. By having these critical design criteria, a constant can be determined from the relationship of the volume of the chamber or cavity within the body member over the volume of the material of the plastic pipe being cut. By use of this constant and knowledge of the dimensions of the pipe to be cut a suitable shell cutter member can be designed for the particular diameter pipe to be cut. The constant discovered by this invention relates to the packing density of chips within the chamber or cavity of the body member of the shell cutter member and is derived by using the most critical wall thickness of plastic pipe encounter for a particular diameter pipe.

In addition to the above, the rotatable shell cutter member of the present invention has critical design criteria with respect to the relationship between the maximum outside diameter of the cylindrical portion of the body member of the shell cutter member and the diameter of the opening of the frusto-conical end portion of the body member. In this respect a constant can be determined between the ratio of the maximum diameter of the shell cutter member and the diameter of the opening in the frusto-conical end portion plus or minus .187 inches and, thus, with either of these dimensions known, the other dimension may be determined.

BRIEF DESCRIPTION OF THE DRAWINGS

FIG. 1 is a vertical, sectional view of the shell cutter member of the present invention, the hub of the shell cutter member being shown partially in section and partially in elevation, and the boring bar of a drilling machine being shown in broken lines.

FIG. 2 is an enlarged bottom end view of the shell cutter member of FIG. 1.

FIG. 3 is a fragmentary view looking substantially in the direction of the line 3—3 of FIG. 2.

FIG. 4 is a view taken substantially on the line 4—4 of FIG. 1.

FIG. 5 is a view taken substantially on the line 5—5 of FIG. 2

FIG. 6 is an elevational view of the detachable blade member.

FIG. 7 is a view of the blade member taken on the line 7—7 of FIG. 6.

FIG. 8 is an end view of the blade member taken on the line 8—8 of FIG. 7.

DETAILED DESCRIPTION OF THE INVENTION

Referring now to the drawings wherein like characters or reference numerals represent like or similar parts, and in particular to FIG. 1, there is disclosed a shell cutter member generally designated at 10 of the present invention for cutting a hole in a plastic pipe P of large diameter. The present shell cutter member 10 is of the type for cutting such plastic pipe P of diameters of four inches or greater up to at least a twelve inch diameter pipe. The wall thickness of the plastic pipe P is generally in the range of 1.625 inches down to 0.550 inches or less depending on the diameter of pipe and/or its intended use. The plastic pipe P is made from a plastic material such as polyvinyl chloride (PVC), polyethylene (PE), polybutylene (PB) and the like, and the shell cutter member 10 is particularly designed for cutting the hardest of these materials, namely, polyvinyl chloride (PVC) and because it is capable of cutting the hardest of these materials, it will also be capable of satisfactory operation on the softer materials.

The shell cutter member 10 includes a body member 12 having a cylindrical portion 14 closed at its upper end by the shell cutter hub 16. The lower end of the cylindrical portion 14 of body member 12 terminates in an inwardly tapered frusto-conical end portion 18. The shell cutter hub 16 which threadedly receives the cylindrical portion 14 of body member 12 as indicated at 20, is also adapted to receive the lower end of a boring bar 22 shown in broken lines. A pin 24 extending through aligned apertures in the socketed portion 26 of the shell cutter hub 16 and the boring bar 22 secures the shell cutter member assembly to the boring bar of a drilling machine which is arranged to rotate and positively advance the shell cutter member. The hub 16 is provided with a threaded socket 28 for receiving the threaded end 30 of a pilot drill 32, the pilot drill having its pointed end 34 extending below the lower-most end of the frusto-conical end portion 18 of the body member 12. While the pilot drill 32 provides a means for retaining the coupon C with the shell cutter member 10 during formation of the hole in the plastic pipe P, it is within the scope of the present invention to taper the wall 36 defining the opening at the lower end of the frusto-conical end portion, the tapering of the wall inwardly and upwardly providing a wedging effect on the coupon C cut.

As best shown in FIG. 5 the shell cutter member 10 is provided with a lengthwise extending slot 40 in the frusto-conical end portion 18. While the slot 40 extends the entire axial extent of the frusto-conical end portion 18, it also extends partially upwardly in the cylindrical portion 14 in a rearward direction relative to the direction of rotation of the shell cutter member 10 at a slight angle. The slot 40 is provided with a leading face 42 and a trailing face 44 when referring to the direction of rotation of the shell cutter member 10. Attached to the trailing face 44 of slot 40 is a blade member 46 having a cutting edge 48. A more detailed description of the blade member 46 and its particular shape will follow later in the specification.

Referring now to FIGS. 2 and 5, it will be noted that the frusto-conical end portion 18 and the cylindrical portion 14 are provided with a recess 50 in their outer surface spaced from the trailing face 44 of the slot 40 in a direction rearwardly of the slot when considering the direction of rotation of the shell cutter member 10. By such an arrangement a wall 52 is provided between the trailing face 44 of the slot 40 and the recess 50, this wall being provided with apertures 54 therethrough. The blade member 46 has threaded apertures 56 arranged to be aligned with the apertures 54 and cap screws 58 extending through the apertures 54 in wall 52 and threaded into the threaded apertures 56 of the blade member 46 and detachably retain the blade member 46 on the trailing face 44 of the slot 40. These cap screws 58 are completely out of the area where they would interfere with the hole being cut and additionally, they do not get clogged with chips which would interfere in their removal when removing or replacing the blade member 46.

The cutter member 46 is wedge-shaped in cross-section and is provided with a chip receiving surface 60 which opposes but is spaced from the leading face 42 of the slot 40. The chip receiving surface 60 extends rearwardly from the cutting edge 48 of the blade member 46 and inwardly of the body member 12 in a direction to cause the chips removed from the pipe to be directed perpendicularly therefrom inwardly and upwardly into the chamber or cavity 62 of the hollow body member 12. It will be noted that the cutting edge 48 of the cutter member 46 is generally parallel to the outer surface of the frusto-conical end portion 18 of the body member 12. Also, the extent of the cutting edge 48 is slightly greater than the extent of the frusto-conical end portion 18 in a transverse plane through the axis of the body member 12 so that there is an outer overlap and an inner overlap. The outer overlap reduces cutting torques or loads on the drilling machine as the hole being formed in the plastic pipe P has a slightly greater diameter than the outside diameter of the cylindrical portion 14 of the body member 12 and, thus, a relief is provided so that the body member does not continually rub on the cylindrical portion 14 of the body member 12. The inner overlap of the cutting edge provides a relief between the wall 36 of the opening of the frusto-conical end portion 18 and the coupon C being cut from the pipe P. This relief between the coupon and the wall 36 is desirable when the pilot drill 32 is used to retain the coupon C throughout the cutting action and the removal of the shell cutter member 10 from the finished hole in the plastic pipe P. Of course, if the pilot drill 32 is not used then the overlap on the inside of the cutting edge 38 is not necessary as the wall 36 may be tapered inwardly at a slight angle to provide a wedging effect for retention of the coupon C. Also, the cutting edge 48 of blade member 46 extends slightly beneath the outer surface of the frusto-conical end portion 18 so that this never contacts and rubs against the plastic pipe P. Again this arrangement provides for a reduction in torque or load on the drilling machine.

The operation of the shell cutter member 10 of the present invention may now be described as follows and by reference to FIG. 1. FIG. 1 discloses the hole already cut in the plastic pipe P and the shell cutter member 10 being removed from the plastic pipe P along with the coupon C. However, it will be appreciated that when the shell cutter member 10 is first lowered into contact with the outside surface of the plastic pipe P, the inner portion of the cutting edge 48 will initially engage the plastic pipe P and begin the cutting of the coupon C. Prior to this, the pilot drill 32 will have penetrated through the wall of the plastic pipe P so that the coupon C when it is being formed is held securely. During the first initial cuts of the cutting edge 48 of the blade member 46, chips are taken from the plastic pipe P as the cutting edge 48 of the blade member 46 is going in and out of the pipe due to the curvature of the same. The chips are directed perpendicularly off of the chip receiving surface 60 of the cutter blade 46 upwardly and inwardly into the cavity 62. After the first few initial cuts of the cutting edge 48 of the blade member 46, the blade member will make a single continuous winding chip which is also directed by the chip receiving surface 60 perpendicularly off of the same upwardly and inwardly into the chamber or cavity 62 where it is captured and stored entirely in the shell. Continued rotation of the shell cutter member 10 and positive advancement of the shell member will result in the inner portion of the cutting edge 48 completely cutting the coupon C from the plastic pipe P with the coupon being finally positioned on the pilot drill 32 at about the position shown in FIG. 1. The shell cutter member 10 continues to rotate and advance and for approximately one half of the cut the continuous winding chip is captured and stored within the chamber 62 and then because of the curvature of the pipe the blade will again actually go in and out of the pipe wall and the chips at this time become discontinuous. However, the only place in which the chips can go is upwardly and inwardly into the chamber 62 of the body member 12. The initial hole cut by cutting of the coupon C is progressively enlarged as more and more of the cutting edge 48 of blade member 46 is utilized until the outer portion of the cutting edge 48 passes completely through the wall of the plastic pipe P. It will thus be seen that once the initial hole has been formed by the cutting of the coupon C, the shell cutter member then progressively enlarges this hole until it is slightly larger than the outside diameter of the cylindrical portion 14 of body member 12. No chips will fall from the shell cutter member 10 into the plastic pipe P as the shell cutter member is removed from the pipe because the shelf formed by the inner surface of the frusto-conical end portion 18 of the body member 12 and the coupon C completely block the exit of chips from the chamber 62 through the opening defined by the wall 36.

Critical design criteria has been discovered whereby the shell cutter member 10 of the present invention may be designed for a particular large diameter plastic pipe P to be cut. By discovery of certain relationships to develop constants, shell cutter members of the present invention may be designed when the pipe size is known between the 4 inch diameter size and the 12 inch diameter size and when the size of the hole desired in the pipe is known for the particular size pipe.

In more detail, the shell cutter member 10 of the present invention must have a maximum diameter G for the hole being cut which is less than the inside diameter of the pipe since it is not desirable to sever the plastic pipe in two as is the usual case when cutting metal pipe with shell cutter members. The maximum diameter G of the cylindrical portion 14 of the body member 12 has a definite relationship to the diameter A of the opening of the frusto-conical end portion 18 which is defined by the wall 36. It has been discovered, for good functional capabilities in shell cutter members for cutting four inch to twelve inch diameter pipe that the formula is:

$$\frac{\text{Maximum Diameter of Shell Cutter } (G)}{\text{Diameter of Opening in Frusto-Conical End Portion } (A)} \pm (.187) = C = 1.647$$

For example, a shell cutter member for cutting a hole in a six inch diameter pipe, may have its outside diameter G selectively set at 5.25 inches, and with this dimension known, the diameter of A may be determined by the formula to be 3.187 inches $\pm$ (1.87 inches). Beyond these limits of less than three inches or greater than 3.375 inches for the diameter A, the performance of the shell cutter member falls off and the functional capabilities of the same are not good. By use of the above-mentioned formula with the constant C' equal to 1.647, shell cutter members for 4 inch, 8 inch and 12 inch plastic pipe may be easily designed when the desired maximum diameter of the hole to be cut is known.

In addition to the above relationship it has also been discovered that there is a definitive relationship between the volume of the chamber 62 and the volume of the material to be removed from the plastic pipe P. This relationship is controlled by the packing density of chips to be received in the chamber or cavity 62 of the body member 12. In this respect, the following formula was developed:

$$\frac{\text{Volume of Cutter } (AI \times E)}{\text{Volume of Pipe } (P.F.A. \times T)} = C = 4.5$$

Where:
AI = Cross-Sectional Inside Area of Body Member Along Length E
E = Effective Length of Said Chamber
P.F.A. = Projected Frontal Area of Pipe (approximately equal to cross-sectional area of outside of body)
T = Thickness of Pipe
C = Constant for Packing Density of Chips (4.5)

With the above formula and using the constant C equal to 4.5 and selecting a 6 inch pipe having a wall thickness T of 1.5 inches, the effective length of the cutter body E can be determined by knowing the outside diameter G of the shell cutter member 10 and the inside diameter D of the shell cutter member. For example, the cross-sectional inside area of the cutter along the length E is determined by the diameter D squared over four. The projected frontal area of the plastic pipe P which is approximately equal to the outside diameter G may be determined by using the outside diameter G squared over four. If the inside diameter D is 4.62 and the outside diameter G is 5.25 then the effective length E which is the length of the chamber from the upper end of the frusto-conical end portion 18 to the closed end of the body member 12 will be 8.625 inches.

In addition to the above discovered criteria for determining the design of the shell cutter member 10, it has also been discovered that the frusto-conical end portion 18 should have an angle B with a plane normal to the axis of the shell cutter member in the range of 30° to 40°. Preferably the angle B is in the order of 35°. The angle C which the chip receiving surface 60 of the blade member 46 has with respect to a plane through the axis of the body member and the cutting edge 48 should be in a range of 25° to 35°. Preferably the angle C is in the order of 30°. The rake angle R which is the angle between the surface of the blade member rearwardly of its cutting edge 48 and a tangent through the cutting edge 48 is in the order of 5° so that there will be relief behind the cutting edge 48 and no drag of the blade member 46 on the plastic pipe P when the cut is being made.

The terminology used in this specification is for the purpose of description and not limitation, the scope of the invention being defined in the claims.

What is claimed is:

1. A rotatable shell cutter member for cutting a hole in large diameter plastic pipe by cutting a coupon to form a hole and enlarging the formed hole when the shell cutter member is positively advanced against the pipe a predetermined distance per rotation of the same, said shell cutter member comprising:

a metal hollow body member closed at one end and open at its other end to define a chamber for chips cut from said pipe, said body member having a cylindrical portion terminating at the said other end in a frusto-conical end portion;

a generally lengthwise extending slot in the frusto-conical end portion, said slot having a leading face and a trailing face as defined by direction of rotation of the shell cutter member;

a blade member on said trailing face of said slot and spaced from the leading face, said blade member having a cutting edge positioned beyond the frusto-conical end portion of said body member and being generally parallel to said frusto-conical end portion of said body member, said blade member having a chip receiving surface opposing the leading face of said slot and extending rearwardly from the cutting edge of the blade member and inwardly of the body member in a direction to cause chips removed from the pipe to be directed inwardly and upwardly into the chamber of said hollow body member above the coupon; and, means to retain the coupon cut from the pipe so that the coupon prevents chips from falling from said chamber of said body member into the hole cut, said coupon retaining means being a pilot drill extending below the lower end of said frusto-conical end portion.

2. A rotatable shell cutter member as claimed in claim 1 in which said cutting edge of said blade member has an extent slightly greater than an extent of said frusto-conical end portion in a transverse plane of said body member whereby a maximum diameter of a hole being cut is slightly greater than a maximum outside diameter of said body member.

3. A rotatable shell cutter member as claimed in claim 2 including means to detachably secure said blade member to the frusto-conical end portion of said body member whereby said blade member may be removed and replaced.

4. A rotatable shell cutter member as claimed in claim 1 in which said slot extends the entire lengthwise extent of said frusto-conical end portion and into said cylindrical portion of said body member.

5. A rotatable shell cutter member as claimed in claim 4 in which the portion of said slot extending into the cylindrical portion of said body member extends rearwardly in a direction of rotation at an angle and is parallel to the chip receiving surface of the blade member opposing the leading face of said slot.

6. A rotatable shell cutter member as claimed in claim 1 in which said blade member has a rake angle behind said cutting edge in the order of five degrees.

7. A rotatable shell cutter member as claimed in claim 1 in which said hollow body member is made from ductile iron and in which said blade member is made from steel.

8. In combination:
  a large diameter plastic pipe having a wall thickness; and
  a rotatable shell cutter member for cutting a hole in said large diameter plastic pipe by cutting a coupon therein to form the hole and enlarging the formed hole when the shell cutter member is positively advanced against the pipe at a predetermined distance per rotation of the same, said shell cutter member including,
  a metal hollow body member closed at one end and open at its other end to define a chamber for chips cut from said pipe, said body member having a cylindrical portion terminating at the said other end in a frusto-conical end portion,
  a generally lengthwise extending slot in the frusto-conical end portion, said slot having a leading face and a trailing face as defined by direction of rotation of the shell cutter member,
  a blade member on said trailing face of said slot and spaced from the leading face, said blade member having a cutting edge positioned beyond the frusto-conical end portion of said body member and being generally parallel to said frusto-conical end portion of said body member, said blade member having a chip receiving surface opposing the leading face of said slot and extending rearwardly from the cutting edge of the blade member and inwardly of the body member in a direction to cause chips removed from the pipe to be directed inwardly and upwardly into the chamber of said hollow body member above the coupon,
  said body member having predetermined dimensions for an inside diameter of said cylindrical portion, an effective length of said chamber from an upper end of the frusto-conical end portion to the closed end of said body member and an outside diameter of said cylindrical portion, said predetermined dimensions being determined by the formula $$\frac{\text{Volume of Cutter } (AI \times E)}{\text{Volume of Pipe } (P.F.A. \times T)} = C$$

Where: $AI$ = Cross-Sectional Inside Area of Body Member Along Length E
$E$ = Effective Length of Said Chamber
$P.F.A.$ = Projected Frontal Area of Pipe (approximately equal to cross-sectional area of outside of body)
$T$ = Thickness of Pipe
$C$ = Constant for Packing Density of Chips; and
  means to retain the coupon cut from the pipe so that the coupon prevents chips from falling from said chamber of said body member into the hole cut.

9. A rotatable shell cutter member as claimed in claim 8 wherein $C$ equals about 4.5.

10. A rotatable shell cutter member as claimed in claim 1 in which the frusto-conical end portion of said body member has an angle with a plane normal to the axis of said body member in a range of 30° to 40°.

11. A rotatable shell cutter member as claimed in claim 10 in which said angle of said frusto-conical end portion is preferably in the order of 35°.

12. A rotatable shell cutter member as claimed in claim 1 in which said chip receiving surface of said cutter member has an angle with respect to a plane through the axis of the body member in the range of 25° to 35°.

13. A rotatable shell cutter member as claimed in claim 12 in which said angle of said chip receiving surface is preferably in the order of 30°.

14. A rotatable shell cutter member as claimed in claim 9 in which the frusto-conical end portion of said body member has an angle with a plane normal to the axis of said body member in a range of 30° to 40° and in which said chip receiving surface of said cutter member has an angle with respect to a plane through the axis of the body member in a range of 25° to 35°.

15. A rotatable shell cutter member as claimed in claim 14 in which said angle of said frusto-conical end portion is preferably in the order of 35°.

16. A rotatable shell cutter member as claimed in claim 14 in which said angle of said chip receiving surface is preferably in the order of 30°.

17. A rotatable shell cutter member as claimed in claim 16 in which said angle of said frusto-conical end portion is preferably in the order of 35°.

18. A rotatable shell cutter member as claimed in claim 17 in which said blade member has a rake angle behind said cutting edge in the order of 5°.

19. A rotatable shell cutter member as claimed in claim 1 in which said blade member is detachably secured to the trailing face of said slot and including means for detachably securing said blade member, said means including a recess in said frusto-conical end portion rearward of the trailing face of said slot to define a wall between the same and said slot, said wall having holes therethrough, and retaining screws extending through said hole and threaded into said blade member.

20. A rotatable shell cutter member as claimed in claim 17 in which said blade member is made from steel and in which said body member is made from ductile iron.

21. A rotatable shell cutter member as claimed in claim 8 in which said means to retain the coupon is a pilot drill extending below the lower end of said frusto-conical end portion.

22. A rotatable shell cutter member as claimed in claim 1 in which said cylindrical portion of said body member has a diameter which has a relationship to a diameter of the opened end of said frusto-conical end portion of said body member and whereby one of said diameters may be determined when the other of said diameters is known by the formula:

$$\frac{\text{Maximum Diameter of Shell Cutter }(G)}{\text{Diameter of Opening in Frusto-Conical End Portion }(A)} \pm (.187) = C = 1.647$$

23. A rotatable shell cutter member as claimed in claim 8 in which C equals 4.5 and in which said cylindrical portion of said body member has a diameter which has a relationship to a diameter of the opened end of said frusto-conical end portion of said body member and whereby one of said diameters may be determined when the other of said diameters is known by the formula:

$$\frac{\text{Maximum Diameter of Shell Cutter }(G)}{\text{Diameter of Opening in Frusto-Conical End Portion }(A)} \pm (.187) = C = 1.647$$

* * * * *